Jan. 2, 1951　　　　　W. M. SCOTT, JR　　　2,536,775
CIRCUIT BREAKER TRIPPING MECHANISM
Filed Dec. 24, 1947　　　　　　　　　　2 Sheets-Sheet 1

INVENTOR.
William M. Scott, JR.
BY
Ostrolenk and Faber.
Attorneys

Jan. 2, 1951 W. M. SCOTT, JR 2,536,775
CIRCUIT BREAKER TRIPPING MECHANISM
Filed Dec. 24, 1947 2 Sheets-Sheet 2

INVENTOR.
William M. Scott, JR.
BY
Ostrolenk & Faber
Attorneys

Patented Jan. 2, 1951

2,536,775

UNITED STATES PATENT OFFICE 2,536,775

CIRCUIT BREAKER TRIPPING MECHANISM

William M. Scott, Jr., Bryn Mawr, Pa., assignor to I. T. E. Circuit Breaker Company, Philadelphia, Pa., a corporation of Pennsylvania Application December 24, 1947, Serial No. 793,610

5 Claims. (Cl. 200—108)

This essentially is a variation of the various selective tripping cases stemming from Patent No. 2,439,165.

Selective tripping systems, as those described in Patent No. 2,439,165, are so arranged that the circuit breakers have a time delay in opening at all current values up to the interrupting capacity of the circuit breaker. Even in a cascaded arrangement of circuit breakers where an instantaneous trip is provided, the trip point of this instantaneous trip is set so high that a time delay is imposed at extremely high values of current.

Circuit breakers that are required to handle high short circuit currents of 25,000 amperes or more perform very well if the circuit breaker is closed when the fault occurs. With the breaker latched in the closed position the time delay does no harm as the circuit breaker will carry this current for some time and then interrupt the circuit.

If, however, a fault exists on the line and an attempt is made to close the circuit breaker against fault current, then many circuit breakers will be severely damaged. This is because the magnetic forces acting on the moving contact due to the short circuit current, tending to force the contacts to the open position, are greater than the force of the closing force of the closing mechanism.

To overcome this condition it is not possible to merely provide more closing force to overcome the opening forces. The closing force is applied whether a fault exists on the line or not. If sufficient closing force were provided to close against a fault, then the closure in the absence of a fault would cause mechanical injury to the breaker.

If a circuit breaker is provided with an instantaneous trip it has been found that it makes little difference whether sufficient closing force is provided or not. The circuit breaker trips open and interrupts the circuit in a normal manner. If the circuit breaker has a time delay trip and if the closing mechanism does not have sufficient closing force to close against the fault current, then the circuit breaker may be severely damaged by an attempt to close the circuit breaker against a fault, which results in the contacts chattering for a period of the time delay.

A solution to this problem would be to provide the circuit breaker with a time delay at all times except during the closing stroke and to provide an instantaneous trip during the closing stroke only.

Figures 1, 2, 3:
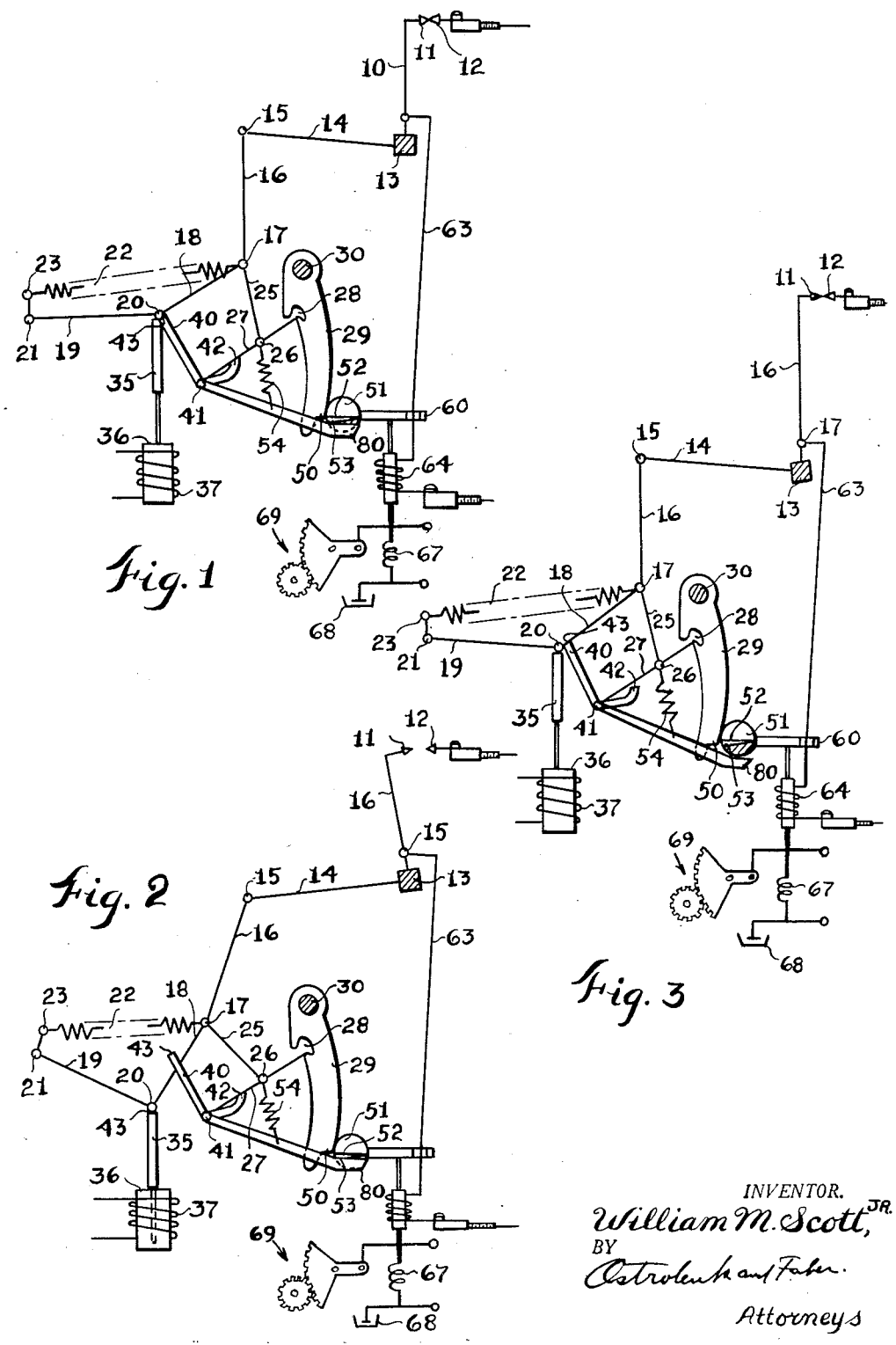
Figure 1 is a diagrammatic view showing a circuit breaker fully closed and subject to sequential tripping. The element which is utilized to permit instantaneous tripping to occur when closing on a short is in defeated position at this time so that the circuit breaker when in position of Figure 1 is subject only to sequential tripping.
Figure 2 shows a circuit breaker fully opened with the circuit breaker elements so arranged that they are subject to sequential tripping.
Figure 3 shows the circuit breaker an instant before the final closed position is achieved. The contacts are just about to engage but the trip unit is so arranged that it may trip instantaneously should the contacts now be closed on a fault without waiting for time delay in the sequential tripping operation to occur.

Referring now to Figures 1, 2, and 3, the type circuit breaker operating mechanism here shown is that shown generally on Patent No. 2,390,735, in which the movable contact arm 10 carrying the contact 11 which engages the stationary contact 12 is mounted on a rotatable shaft 13 operated by the crank arm 14 connected at pin 15 to the link 16 which in turn is connected by pin 17 to the toggle consisting of links 18 and 19 connected by the knee pin 20.

The left hand end of link 19 is stationarily mounted at the pin 21. The toggle 18 and 19 is provided with a collapsing spring 22 connected between extension 23 of link 19 and the pin 17. The pivot 17 at the lower end of link 16 is also connected by link 25 to the pin 26 on the latching link 27 which is held in the latch 28 of the latching element 29 which in turn is pivoted on the horizontal shaft 30. The knee pin 20 of the toggle 18—19 is provided with a roller which may be engaged by the extension 35 of armature 36 of the solenoid closing mechanism 37 to extend the toggle 18—19 from the position of Figure 2 to the position of Figure 1 to effect closure of the circuit breaker. An abutment member 40 is provided pivotally mounted at 41 at the lower pivot of the latching link 27 of the said abutment being in the form of a bell crank having an end 42 extending beneath the latching lever 27 and an upper end 43 which rides up under the roller on pin 20 when the circuit breaker is closed.

As the circuit breaker moves from the open circuit position of Figure 2 through the intermediate position of Figure 3 to the position of Figure 1 during closing, the abutment 40 is pushed aside to permit the roller 20 to ride up, the said abutment 40 being spring-biased in a counter-clockwise direction so that the end 43 thereof will snap back under the roller 20 and hold the roller up.

When the circuit breaker is tripped then, as fully described in Patent No. 2,390,735, the abutment 40 is rotated in a clockwise direction. As the latch lever 27 drops, the roller and pin 20 will roll off the abutment 40 so that the circuit breaker eventually returns to the position of Figure 2, the right hand end of the latch lever 27 moving out of the latch 28 sliding down and then snapping back again as the tension spring 22 returns the toggle elements to their original position.

The latch lever 29 is of course biased into counter-clockwise rotation by the opening spring acting on the contact arm 10 tending to rotate the contact arm 10 in a counter-clockwise direction, the load being transmitted to the latching lever which bears down on the latching 28. This tends to rotate the lower end 50 of the latching element 29 against the milled shaft 51. Further as described in the aforesaid Patent No. 2,390,735, the milled shaft 51 is provided with a milled recess 52 which when the milled shaft is rotated in a counter-clockwise direction moves opposite the latching end 50 of the latching element 29 so that the latching element 29 may be forced into the milled portion 52 of the milled shaft and cause a tripping operation to occur. This also is identical in operation to the disclosure of Patent No. 2,390,735.

In the above, I have described a standard circuit breaker mechanism. Such a breaker can be connected in a system in which the time of circuit interrupters of each breaker is so selected that the circuit breaker nearest the fault and capable of interrupting the fault opens first. This is effected by providing individual long and short time delay devices for each circuit breaker as described in Patent No. 2,439,165.

However, when such a circuit breaker is being closed, it is desirable that the time delays be rendered momentarily ineffective so that should the breaker be closed on a short circuit fault, it will interrupt the circuit instantaneously without the aforementioned time delay.

Figure 6:
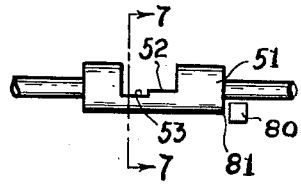
Figure 6 is a front elevation of the milled shaft used in my novel tripping system for the purpose of defeating sequential tripping operations and for producing an instantaneous trip at the instant of closing the circuit breaker should the closing occur on a fault.
Figure 7:
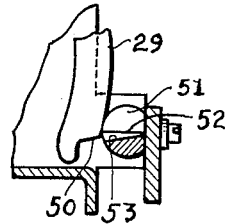
Figure 7 is a view partly in cross section taken on line 7—7 of Figure 6 looking in the direction of the arrows.

The essential feature of this invention is the provision of a construction which during the closing of the circuit breaker defeats the time delay. This is effected by the provision of an additional milled element 53 as seen in Figures 6 and 7. This additional milled element 53 is deeper than the milled element 52 and is so arranged that when the milled shaft 51 is moved axially, the milled element 53 extends beneath the end 50 of the latching element 29 and the latching element 29 is forced, without any time delay, into the tripping position.

Figure 4:
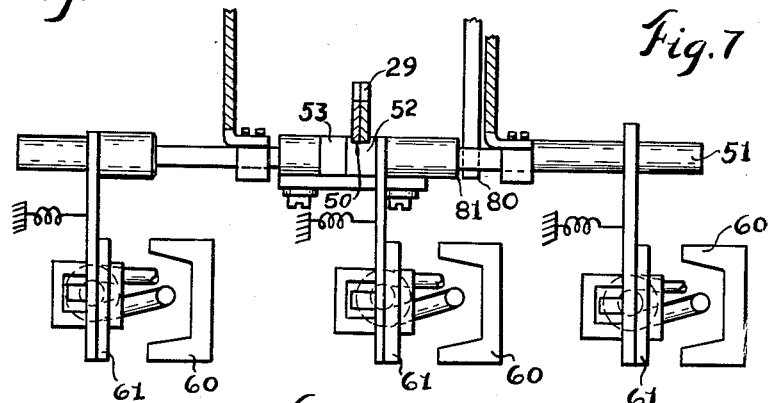
Figure 4 is a top view of the trip elements of my novel circuit breaker showing the means for producing instantaneous trip irrespective of sequential tripping operations at the instant of closing.
Figure 5:
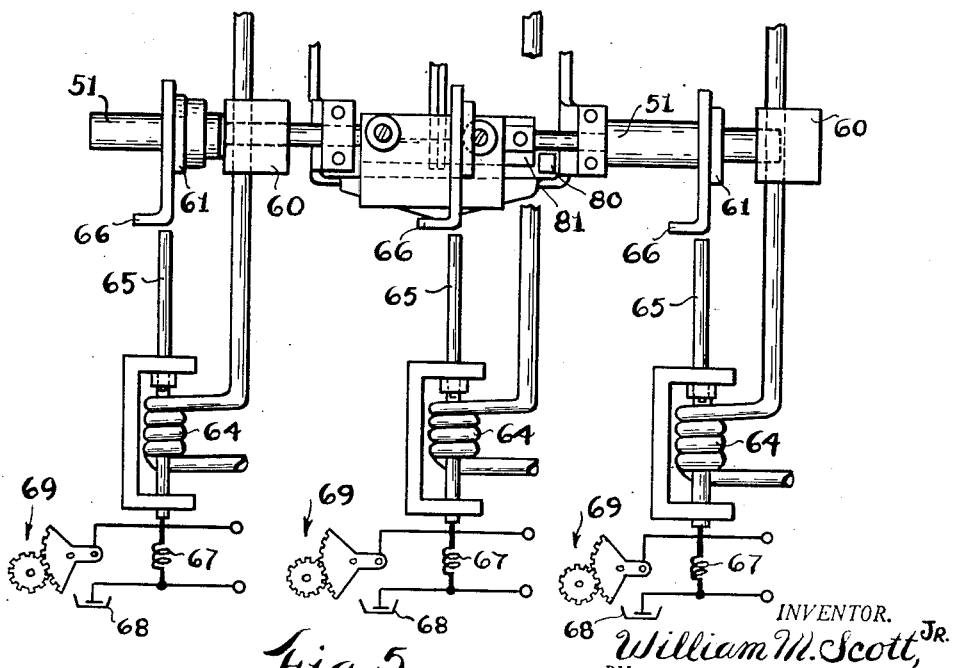
Figure 5 is a front view showing the elements of Figure 4.

This additional milled element 53 is brought into operation in response to the energization of instantaneous trip magnet 60 (Figure 4) connected in series with the winding 64. Magnet 60 attracts the armature 61 attached to the milled shaft 51 to pull the milled shaft 51 over to the right with respect to Figures 4 and 5 when the magnet 60 is energized by a short circuit current.

As pointed out above for sequential operation, the tripping armature 65, operating in response to fault currents in winding 64 engages and moves the tripping lever 66 on the milled shaft 51.

The movement of tripping armature 65, however, is subject to the time delays 68 and 69 connected by spring 67, here shown schematically but which may be of the type shown in Patent No. 2,439,165. This time delay mechanism comprises a long time delay in response to overload fault current and a short time delay in response to short circuit fault current. The long time delay 68 and short time delay 69 are calibrated to bear a relationship to the time delays of other breakers in the system so that the circuit breaker nearest the fault and having sufficient capacity to interrupt the fault current trips before the other circuit breakers nearer the power supply can operate, thus isolating the fault with a minimum of circuit failure.

During the closing operation of the circuit breaker, if it is closed on a short circuit, the magnet 60 is energized to pull the milled shaft 51 to a position where the deeper milled portion 53 registers with the end 50 of the latching element 29. Thus, if the circuit breaker is closed on a short circuit, the magnet 60 will be energized to pull over the milled shaft 51 and cause a tripping operation to occur, the circuit breaker being instantaneously tripped.

The pick-up point of the magnet 60 is set high, say, from 5 times the full load current of the circuit up to the interrupting capacity of the circuit breaker so that motor starting current and other overload currents of short duration do not effect tripping of this magnet.

However, with the arrangement thus far described, the circuit breaker will be tripped instantaneously by energization of magnet 60 whenever a short circuit occurs. Accordingly, means is provided to defeat the operation of the magnet 60 at any time other than during the actual closing operation. For this purpose, the abutment 40 (Figures 1, 2, and 3) is provided with an additional extension 80 so arranged that it will, in both the fully closed position of Figure 1 and fully opened position of Figure 2 ride up against the shoulder 81 of the milled shaft 51 and prevent the movement of the milled shaft 51 to the right with respect to Figures 4, 5, and 6.

Thus, in the normal position of the abutment member 40, while it is supporting the roller on pin 20 or during the open position of the circuit breaker, the end 80 of the extension 40 of the abutment member 40, bears against the left hand shoulder 81 of the milled shaft and prevents the milled shaft from being pulled over by the magnet 60 acting on the armature 61. Accordingly the armature 61 cannot, under these conditions, be pulled over by energization of magnet 60. The circuit breaker is therefore tripped only under the influence of the solenoid 65 acting under control of the time delay devices on the trip lever 66 which rotates the milled shaft 51.

During the actual closing operation however, as shown in Figure 3, the closing armature extension 35 pushes the roller on pin 20 past the upper end 43 of the abutment 40 to a position where the abutment is slightly displaced in a clockwise direction from the final closed position shown in Figure 1, thereby moving the extension 80 of the abutment 60 out and down from its abutment with the shoulder 81 of the milled shaft. At this time, the movable contact 11 engages the stationary contact 12 and if at this time, there is a short circuit in the circuit protected by the circuit breaker, then the short circuit current will flow through the lead 63 energize the magnet 60 to attract the armature 61 and the armature 61 will be pulled over by the magnet 60 since the abutment extension 80 at this moment is not in contact with the shoulder 81 of the milled shaft. The milled shaft can thus be pulled over so that the deeper milled portion 53 moves opposite the latching element and thus permits a complete tripping of the circuit breaker.

When, however, the circuit breaker is fully closed, the roller on pin 20 moves past the upper end 43 of the abutment so that it may rest on the abutment and at this time, the abutment is returned by its own spring 54 back to the position of Figure 1 where the extension 80 of the abutment moves in against the shoulder 81 of the milled shaft and the milled shaft can no longer be pulled sideways irrespective of the pull exerted by magnet 60 and therefore, no short circuit current can actually effect the trip of the circuit breaker in this instantaneous manner; but instead the circuit breaker can only be tripped in accordance with the sequential tripping system already provided and is subject to time delay 68 or other time delay elements as previously described in connection with the sequential trip Patent No. 2,439,165.

In order to insure complete closure of the contacts before the instantaneous operation of magnet 60 ceases to be effective, a sufficient overlap is provided between the full engagement of contacts 11 and 12 and the final movement of the roller on pin 20 to its position of rest at which instant extension 80 moves into the path of 81. In other words, a short interval is allowed between the period after the contacts are fully engaged and the final movement interposing extension 80 in the path of the milled shaft. During this interval instantaneous tripping during the closing of the circuit breaker is made possible.

While in the above I have described one arrangement for effecting the desired result of providing instantaneous trip during closing and time delay trip during all other periods, it will be obvious that I can provide other structural arrangements for effecting this result. I can for example use only one trip coil and simply disconnect this time delay from the armature of the trip coil during closing operation.

I claim:

1. In a circuit breaker for protecting an electric circuit, said circuit breaker having a pair of cooperable contacts, a first tripping mechanism for effecting disengagement of said contacts in response to fault currents in the circuit protected by said circuit breaker, a time delay device for controlling the time of operation of said tripping mechanism in response to the fault currents, a second tripping mechanism for effecting instantaneous disengagement of said contacts in response to fault currents in the circuit protected by said circuit breaker, a circuit breaker closing element for operating said contacts to engagement and a construction on said circuit breaker and operative following contact engagement for blocking said second tripping mechanism from operation.

2. In a circuit breaker having a pair of cooperable contacts, means for biasing one of said contacts to disengage the other of said contacts, a latch for latching said contacts in engagement against said bias, a first fault current responsive trip magnet for operating said latch to effect disengagement of said contacts in response to fault currents in the line protected by said circuit breaker, a time delay device for controlling the time of operation of said relay in response to the fault currents, a circuit breaker closing element for operating said contacts to engagement, a second fault current response trip magnet in series with said first trip magnet operative for effecting substantially instantaneous disengagement of said contacts in response to short circuit fault currents in the circuit of said circuit breaker, and mechanism for rendering said last mentioned means non-effective while said contacts are in engagement.

3. In a circuit breaker having a pair of cooperable contacts for controlling an electric circuit, means for biasing one of said contacts to disengage the other of said contacts, a latch for latching said contacts in engagement against said bias, a first trip magnet connected in series in the line being protected and responsive to a fault in said circuit for operating said latch for effecting disengagement of said contacts, time delay means for delaying the operation of said electromagnet, apparatus for manually effecting engagement of said contacts, and a second trip magnet connected in series in said line responsive to fault currents and operative only during the closing operation of said contacts for effecting instantaneous disengagement of said contacts in response to a fault current in the circuit at the instant of closing of said contacts, and mechanism for rendering the operation of said second trip magnet ineffective while said contacts are in engagement.

4. In a circuit breaker having a pair of cooperable contacts for controlling an electric circuit, latching mechanism for latching said contacts in engaged position, electromagnetic means responsive to fault currents in the circuit being protected, a mechanism controlled by said electromagnetic means for operating said latch to permit disengagement of said contacts, and apparatus operated by said electromagnetic means for operating said latch to permit instantaneous disengagement of said contacts, said mechanism including a time delay for delaying its action on said latch mechanism after the energization of said electromagnetic means, said apparatus being operative only during the closing operation and for an instant following engagement of said contacts, and a mechanical mechanism for blocking operation of said apparatus during the period while said contacts are in engagement.

5. In a circuit breaker having a pair of cooperable contacts for controlling an electric circuit, latching mechanism for latching said contacts in engaged position, electromagnetic means responsive to fault currents in the circuit being protected, a mechanism controlled by said electromagnetic means for operating said latch to permit disengagement of said contacts, and apparatus operated by said electromagnetic means in response to fault current for operating said latch to permit instantaneous disengagement of said contacts, said electromagnetically controlled mechanism including a time delay for delaying its action on said latch mechanism after the energization of said electromagnetic means, said apparatus being operative only during the closing operation and for an instant following engagement of said contacts and a mechanical stop for rendering said apparatus non-operative while said contacts are engaged.

WILLIAM M. SCOTT, Jr.

REFERENCES CITED

The following references are of record in the file of this patent:

UNITED STATES PATENTS

| Number | Name | Date |
| --- | --- | --- |
| 2,272,752 | Spurck | Feb. 10, 1942 |